Oct. 17, 1967  J. L. JENSEN  3,348,130
CONTROL APPARATUS
Filed July 27, 1964
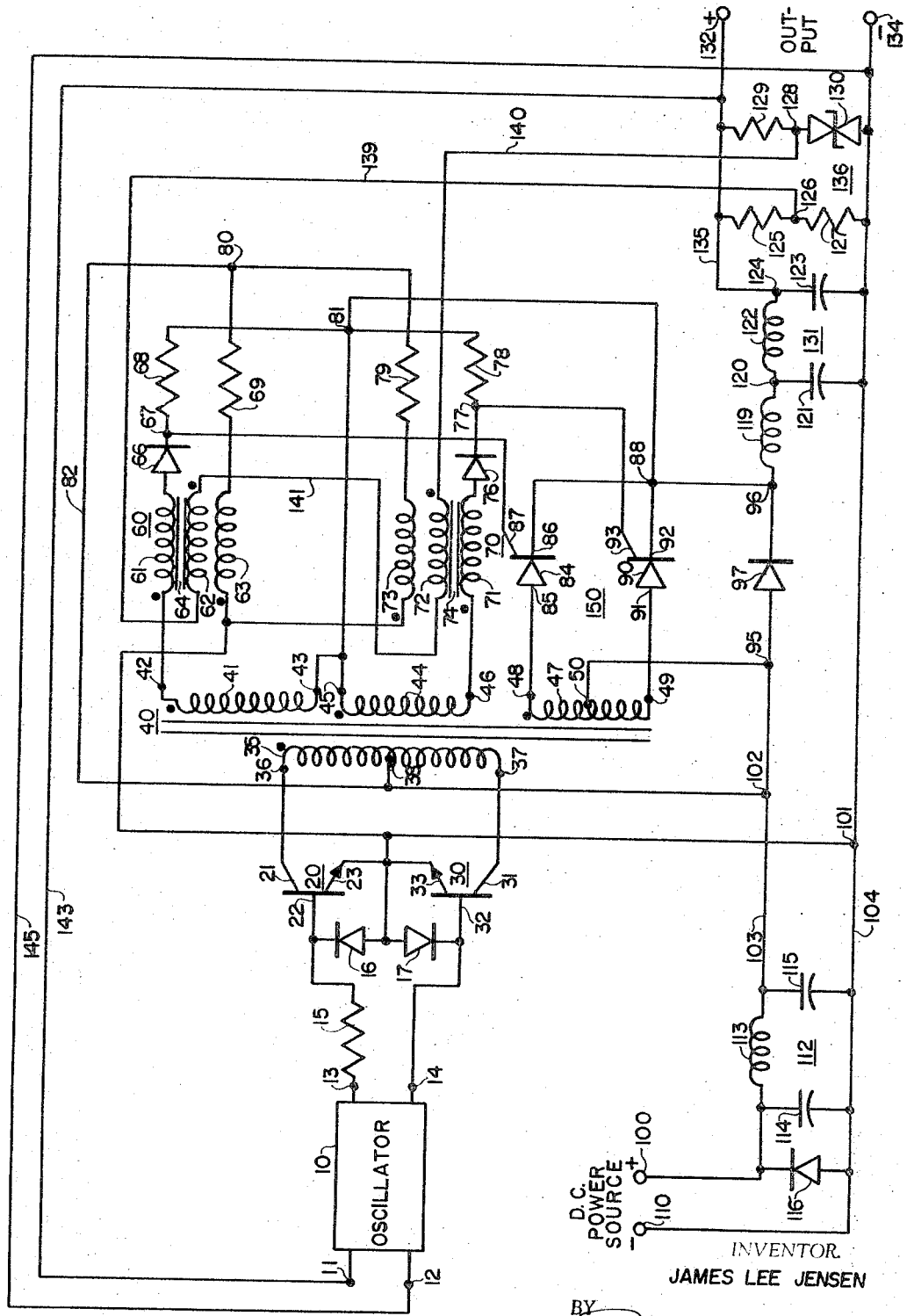
INVENTOR.
JAMES LEE JENSEN
BY
Roger W. Jensen
ATTORNEY United States Patent Office 3,348,130
Patented Oct. 17, 1967

3,348,130
CONTROL APPARATUS
James Lee Jensen, Frankfurt am Main, Germany, assignor to Honeywell Inc., Minneapolis, Minn., a corporation of Delaware
Filed July 27, 1964, Ser. No. 385,214
4 Claims. (Cl. 323—22)

ABSTRACT OF THE DISCLOSURE

A direct voltage regulating circuit which receives power from a direct voltage source and through the use of an oscillator and an AC to DC converting circuit having a variable DC output produces a regulated output which is stable in voltage. This is accomplished by sensing the output voltage and varying a control input to the AC to DC converter so as to add just enough voltage in series with the input source voltage to provide the regulated output.

The invention

This invention relates generally to voltage regulation apparatus for a DC power source. More particularly, the present invention provides means for delivering to a load of substantially constant DC potential from a source whose output might vary considerably due to variations in loading, temperature, or other factors.

For many applications it is critical that the energizing potential be maintained at constant value within a very close tolerance range. When the potential is obtained from sources such as fuel cells, thermal batteries, solar cells, or a similar device, the voltage available might vary considerably depending on environmental conditions or the load which the power supplies are required to energize. It therefore becomes necessary to provide regulation which will assure that the voltages are maintained at the required level. A number of methods have been proposed and used with varying degrees of success. An example is the semiconductor voltage regulator apparatus which is the subject of Patent 2,965,833, issued on Dec. 20, 1960.

The voltage regulator system disclosed herein is in many ways similar to the system discolsed in the above referenced patent. A significant improvement in the present system is the use of silicon controlled rectifiers in a time-modulated manner to produce the required amount of voltage boost. Using this arrangement, it is possible to reduce the number of active elements in the system and to reduce the power losses in the circuits, thereby improving the efficiency of the regulator.

It is therefore the object of the present invention to provide an improved DC voltage regulator.

A more specific object of the present invention is to provide a substantially constant voltage to a load from a source of DC potential which varies beyond the acceptable limits of tolerance.

These and other objects of the present invention will be more clearly understood upon a consideration of the following specification, claims, and drawing.

The single figure is a schematic diagram of a preferred embodiment of this invention.

Referring now to the drawing, theer is shown an oscillator 10 which might be of the general type shown in U.S. Patent 2,774,878. Oscillator 10 has a pair of input terminals 11 and 12 and a pair of output terminals 13 and 14. Output 13 of oscillator 10 is connected to a base electrode 22 of a transistor 20 through a resistor 15. Transistor 20 further has a collector 21 and an emitter 23. Output terminal 14 of oscillator 10 is connected to a base electrode 32 of a transistor 30. Transistor 30 further has a collector 31 and an emitter 33. Emitter 23 of transistor 20 is connected directly to emitter 33 of transistor 30. A diode 16 is connected between emitter 23 and base 22 of transistor 20, diode 16 being oriented for forward current flow from emitter 23 to base 22. A diode 17 is connected between emitter 33 and base 32 of transistor 30. Diode 17 is oriented for forward current flow from emitter 33 to base 32.

Collector 21 of transistor 20 is connected to an end terminal 36 of a primary winding 35 of a transformer 40. Primary winding 35 further has an end terminal 37 and an intermediate tap 38. End terminal 37 of winding 35 is connected directly to collector 31 of transistor 30. Transformer 40 further has a secondary winding 41 with end terminals 42 and 43, a secondary winding 44 with end terminals 45 and 46, and a secondary winding 47 with end terminals 48 and 49 and an intermediate tap 50.

End terminal 42 of secondary winding 41 is connected to one end of a magnetic winding 61 of a magnetic switching means or control means 60. Switching means 60 further has additional windings 62 and 63 and a saturable magnetic core 64. The other end of winding 61 is connected to a junction 67 through a diode 66, the diode being oriented for forward current flow from winding 61 to junction 67. End terminal 43 of secondary winding 41 is connected directly to end terminal 45 of secondary winding 44. End terminal 46 of secondary winding 44 is connected to one end of a magnetic winding 71 of a magnetic switching means or control means 70. The other end of winding 71 is connected to a junction 77 through a diode 76, diode 76 being oriented for forward current flow from winding 71 to junction 77. Junction 67 is connected to a junction 81 through a resistor 68 and junction 77 is connected to junction 81 through a resistor 78. Junction 81 is further connected directly to end terminals 43 and 45 of secondary windings 41 and 44, respectively.

Magnetic switching means 70 has, in addition to winding 71, windings 72 and 73 and a saturable core 74. One end of winding 63 is connected directly to one end of winding 73 and is also connected directly to emitter electrodes 23 and 33 of transistors 20 and 30 respectively. The other end of winding 63 is connected to a junction 80 through a resistor 69 and the other end of winding 73 is connected to junction 80 through a resistor 79. Junction 80 is connected by means of a conductor 82 to center tap 38 on primary winding 35 of transformer 40. Conductor 82 is further connected to terminal 102 on conductor 103 and emitters 23 and 33 are further connected to terminal 101 on conductor 104.

Terminal 102 is connected to a positive terminal 100 of DC power source through a series path of conductor 103 and an inductor 113. Terminal 101 is connected to negative terminal 110 of DC power source by conductor 104. Inductor 113 forms a filter together with a capacitor 115 connected between conductors 103 and 104, a capacitor 114 connected between conductor 104 and the other side of inductor 113, and a diode 116 connected in parallel with capacitor 114 and oriented for forward current flow from terminal 110 to terminal 100.

Terminal 102 on conductor 103 is connected to terminal 95 adjacent the anode side of a diode 97. The cathode of diode 97 is connected to a terminal 96. An inductor 119 is connected between terminal 96 and a terminal 120. A capacitor 121 is connected between terminal 120 and conductor 104 and an inductor 122 is connected between terminal 120 and a terminal 124 on a conductor 135. A capacitor 123 is connected between terminal 124 and conductor 104. Inductors 119 and 122 together with capacitors 121 and 123 form a line filter 131. Terminal 124 is connected to an output terminal 132 through conductor 135 and conductor 104 connects the negative terminal 110 of D.-C. power source directly to an output terminal 134.

A resistor 125 is connected between conductor 135 and a junction 126, and resistor 127 is connected between junction 126 and conductor 104. Resistors 125 and 127 form a voltage divider between output terminals 132 and 134. A resistor 129 is connected between conductor 135 and a junction 128 and a double anode zener diode 130 is connected between junction 128 and conductor 104. Resistors 125, 127, and 129, together with zener diode 130, form a voltage detector circuit 136. An error signal appears between junctions 126 and 128 as the voltage between output terminals 132 and 134 varies from a predetermined value.

A current path is provided between junctions 126 and 128 comprising of a conductor 139 connecting junction 126 to one end of winding 62 of magnetic switching means 60, winding 62, a conductor 141 connecting the other end of winding 62 to one end of winding 72 of magnetic switching means 70, winding 72, and a conductor 140 connecting the other end of winding 72 to junction 128. Output terminal 132 is connected to input terminal 11 of oscillator 10 by means of a conductor 143 and output terminal 134 is connected to input terminal 12 of oscillator 10 by means of a conductor 145.

End terminal 48 of secondary winding 47 on transformer 40 is connected to anode electrode 85 of a silicon controlled rectifier 84. Silicon controlled rectifier 84 further has a cathode electrode 86 and a control electrode 87. End terminal 49 of secondary winding 47 is connected to anode electrode 91 of silicon controlled rectifier 90. Silicon controlled rectifier 90 further has a cathode electrode 92 and a control electrode 93. Control electrode 87 of silicon controlled rectifier 84 is connected directly to junction 67 and control electrode 93 of a silicon controlled rectifier 90 is connected directly to junction 77. Cathode electrodes 86 and 92 are connected together at junction 88 which is further connected to junctions 81 and 96. The present invention is not limited to the use of silicon controlled rectifiers. Other semiconductor switching means, such as a silicon controlled switch or a transistor switching circuit could be used instead. Intermediate tap 50 of secondary winding 47 is connected to junction 95. Silicon controlled rectifiers 84 and 90, together with secondary winding 47, comprise a full wave rectifier circuit 150 whose output signal appears between junctions 95 and 96 across diode 97.

*Operation*

A D.-C. potential is applied between input terminals 100 and 110 and transmitted through filters 112 and 131 and diode 97 to output terminals 132 and 134. The function of filter 112 is to suppress any transient or other short range variations in the D.-C. power source. The magnitude of the voltage appearing between output terminals 132 and 134 is the sum of the voltage from the power source appearing between input terminals 100 and 110 and the voltage appearing between junctions 95 and 96 across diode 97 which is the output of rectifier circuit 150. The function of line filter 131 is to smooth the variations in voltage introduced by the signal from rectifier circuit 150.

As can be seen, the voltage between output terminals 132 and 134 may be controlled by controlling the voltage output of rectifier 150 between junctions 95 and 96. The voltage output of rectifier 150 in turn may be controlled by controlling the firing angle of silicon controlled rectifiers 84 and 90. Voltage detector 136 detects the voltage variation between output terminals 132 and 134 and provides an error signal between junctions 126 and 128. This error signal is used to regulate the firing angles of silicon controlled rectifiers 84 and 90. The manner in which this is accomplished will be explained later on.

Oscillator 10 is energized between its input terminals 11 and 12 with regulated D.-C. voltage from output terminals 132 and 134 of the voltage regulator. An A.-C. signal appears between output terminals 13 and 14 of oscillator 10 and is applied between base electrodes 22 and 32 of transistors 20 and 30, respectively. An amplified A.-C. signal appears across primary winding 35 of transformer 40. Transistors 20 and 30, together with primary winding 35, comprise a power amplifier. The A.-C. signal across primary winding 35 is induced in secondary windings 41, 44, and 47. The windings are arranged in a relationship to each other such that at any instant of time the top ends of the windings in the drawing are of the same polarity. This is illustrated in the drawing by dots at the top of each winding.

The signal appearing across the secondary winding 47 is rectified by rectifying circuit 150 and added to the D.-C. voltage from the D.-C. power source. The magnitude of output signal from rectifying network 150 is controlled by pulse width modulation. Pulse width modulation is accomplished by controlling the firing angles of silicon controlled rectifiers 84 and 90. The signals to the gate electrodes of silicon controlled rectifiers 84 and 90 are provided from magnetic switching means 60 and 70 respectively. Magnetic switching means 60 and 70 each are comprised of three windings on a saturable core. Each winding contributes a portion of the magnetizing force on the core. When the total magnetizing force, which is the sum of the contribution by each winding, exceeds a certain value determined by the magnetizing characteristics of the core, the core will saturate and the impedance to the current flow in each of the three windings will decrease considerably. This decrease in impedance will cause a larger current to flow in the windings. The current pulse thus produced is used to energize the gate electrodes of contrloled rectifiers 84 and 90 to switch the silicon controlled rectifier into conduction. Constant voltage from the D.-C. power source is applied across windings 63 and 73. The voltage across windings 62 and 72 is a function of the error signal between terminals 126 and 128 of the voltage detector 136, and the voltage across windings 61 and 71 is a function of the output of oscillator 10. The current caused to flow in windings 63 and 73 by the D.-C. voltage is in itself not enough to saturate cores 64 and 74.

During the portion of the cycle of oscillator 10 when the end terminal 36 side of primary winding 35 is positive the induced voltage across secondary winding 41 will cause a current to flow through winding 61 of magnetic switching means 60 through diode 66 and resistor 68 back to end terminal 43 of winding 41. Similar voltage will be induced in secondary winding 44. However, no significant current will flow through winding 71 of magnetic switching means 70 and resistor 78 because diode 76 will provide a high impedance to the current flow. While magnetic core 64 remains in an unsaturated condition, the majority of the voltage induced in secondary winding 41 will be dropped across winding 61. At the same time the voltage dropped across resistor 68, which is also applied between control electrode 87 and cathode electrode 86 of silicon controlled rectifier 84, will be relatively small. With the continued applied voltage from winding 41, the magnetic flux in core 64 increases until eventually core 64 saturates. At the instant when core 64 saturates, the voltage dropped across winding 61 will decrease and a larger portion of the voltage will be dropped across resistor 68. This causes the potential of junction 67 to become much more positive with respect to junction 81, thus providing a positive signal to gate electrode 87 and causing silicon controlled rectifier 84 to switch into conduction. When rectifier 85 is conducting, the portion of the signal induced in secondary winding 47 between end terminal 48 and center tap 50 is applied between junctions 95 and 96 across diode 97.

During the second half of the cycle of oscillator 10, the lower ends of the windings become positive with respect to the upper ends. The induced voltage across secondary winding 44 causes a current to flow from end terminal 46 of winding 44 through winding 71 of magnetic switching means 70, through diode 76, and through resistor 78 back to end terminal 45 of winding 44. No significant current flows through winding 61 of magnetic switching means 60 as a result of the voltage induced in secondary winding 41 because diode 66 provides high impedance. With the continued applied voltage from winding 44, the magnetic flux in core 74 increases until core 74 saturates. As core 74 saturates, the potential drop across winding 71 suddenly decreases while the potential drop across resistor 78 increases. Gate electrode 93 of silicon controlled rectifier 90 therefore becomes more positive with respect to cathode electrode 92, thereby switching rectifier 90 into conductive state. When silicon controlled rectifier 90 is conducting, the portion of the signal induced in secondary winding 47 between end terminal 49 and center tap 50 is applied between junctions 95 and 96 across diode 97.

It can be seen that during both halves of the cycle junction 96 is positive with respect to junction 95. The voltage appearing between junctions 95 and 96 is added to the voltage from the D-C power source. The average amount of this added voltage depends on the fraction of the cycle during which silicon controlled rectifiers 84 and 90 are conducting. The firing angle of the rectifiers is controlled by current through windings 62 and 72 of the magnetic switching means. The current through windings 62 and 72 either aids or opposes the saturation of cores 64 and 74 depending on the direction of the current. The magnitude and the direction of current through windings 62 and 72 depends on the output of voltage detector 136. Double anode Zener diode 130 assures that the potential drop between junction 128 and output terminal 134 is always the same. Any variations in the potential between output terminals 132 and 134 must therefore be absorbed by resistor 139. The potential of junction 126, on the other hand, varies with changes in output voltage. If the circuit is designed such that for a predetermined output voltage the voltage drop across the double anode Zener diode 130 is exactly the same as the voltage drop across resistor 127, then junctions 126 and 128 would be at the same potential and there will be no error signal and no current through windings 62 and 72 of magnetic switching means 60 and 70. If the voltage across the output terminals 132 and 134 increases, junction 126 will become positive with respect to junction 128 and the current will flow from junction 126 through winding 62, through winding 72, and back to junction 28. The sense of windings 62 and 72 is such that the magnetizing force produced in winding 62 will oppose the magnetizing force produced by windings 61 and 63, and the magnetizing force in winding 72 will oppose the magnetizing force in windings 73 and 71. This will delay the saturation of cores 64 and 74 and will thus delay the firing or the switching of rectifiers 84 and 90 causing in turn a smaller fraction of the signal to appear between junctions 95 and 96. Thus, an increase in output voltage between terminals 132 and 134 wlil cause a reduction in the signal between junctions 95 and 96 thereby tending to reduce the output voltage which is the sum of the output from the D-C power source and the signal appearing between junctions 95 and 96.

If, however, the output voltage drops below the predetermined value, then the potential of junction 126 will be negative with respect to junction 128 and the current will flow from junction 128 through winding 72, through winding 62, and back to junction 126. This current will aid the saturation of cores 64 and 74 causing the saturation to occur earlier in the cycle and thereby increasing the output signal of rectifying circuit 150 between junctions 95 and 96 and increasing the output voltage between output terminals 132 and 134. Filter 131 is provided to smooth the variations in the D-C signal introduced by the rectifying circuit 150.

Many variations and embodiments are possible within the spirit of this invention. It is, therefore, understood that the specific embodiment of my invention shown here is for the purpose of illustration only, and that my invention is limited only by the scope of the appended claims.

I claim:
1. A D-C voltage regulating apparatus comprising:
   a pair of input terminals adapted for connection to a direct current potential source;
   a pair of output terminals;
   an oscillator means energized from said potential source;
   a silicon controlled rectifier, said rectifier having an anode connected to receive the signal from said oscillator means, a cathode, and a gate electrode;
   control means, including magnetic switching means, adapted to receive a control signal responsive to the voltage from said output terminals and a further signal from said oscillator means and having an output connected to said gate electrode of said silicon controlled rectifier to render said rectifier conductive for at least a fraction of a cycle of said oscillator, the fraction of the cycle during which said controlled rectifier is conductive depending on the magnitude of the voltage signal between said output terminals;
   adding means for receiving and adding the signals from said potential means and said rectifier and providing an output which is a function of the sum of the two; and
   a filter means connected to receive the signal from the output of said adding means, said filter means having its output connected to said output terminals of the voltage regulator apparatus.

2. A D-C voltage regulating apparatus comprising:
   a pair of input terminals adapted for connection to a direct current potential source;
   a pair of output terminals;
   potential comparison means for comparing the potential appearing at said output terminals with a reference potential to produce an output signal whose magnitude is a function of the compared potentials;
   transformer means having a primary winding and at least one secondary winding, said secondary winding having two end terminals and an intermediate tap;
   an oscillator means energized from said potential source, said oscillator having its output connected to energize said primary winding of said transformer means;
   a rectifier means comprising a first and a second controlled rectifier means each having a power input, a power output and a control electrode, the input of said first controlled rectifier means being connected to one end terminal of said secondary winding and the input of said second controlled rectifier means being connected to the other end terminal of said secondary winding, and means connecting said power output terminals of said first and said second controlled rectifier means to a common junction which together with said intermediate tap on said secondary winding a unipolar output signal from said rectifier means; diode means connected between said intermediate tap and said common junction;
   control means adapted to receive a signal from said potential comparison means and a further signal from said oscillator means and connected to said control electrodes of said controlled rectifier means to render said controlled rectifier means conductive during at least a fraction of each cycle of said oscillator means, the fraction of the cycle during which each controlled rectifier is conductive depending on the magnitude of the signal from said potential comparison means;
   adding means for receiving the signals from said potential source, adding thereto the unipolar signal across said diode means and providing an output whose magnitude is proportional to the sum of two; and
   a filter means connected to receive the signal from the output of said adding means, said filter means having its output connected to said output terminals of the voltage regulating apparatus.

3. A D-C voltage regulating apparatus comprising:
a pair of input terminals adapted for connection to a direct current potential source;
a pair of output terminals;
potential comparison means for comparing the potential appearing at said output terminals with a reference potential to produce an output signal whose magnitude is a function of the compared potentials;
transformer means having a primary winding and at least one secondary winding, said secondary winding having two end terminals and an intermediate tap;
as oscillator means energized from said potential source, said oscillator having its output connected to energize said primary winding of said transformer means;
a rectifier means comprising a first and a second controlled rectifier means each having a power input, a power output and a control electrode, the input of said first controlled rectifier means being connected to one end terminal of said secondary winding and the input of said second controlled rectifier means being connected to the other end terminal of said secondary winding, and means connecting said power output terminals of said first and said second controlled rectifier means to a common junction which together with said intermediate tap on said secondary winding provides a unipolar output signal from said rectifier means; diode means connected between said intermediate tap and said common junction;
control means adapted to receive a signal from said potential comparison means and a further signal from said oscillator means and connected to said control electrodes of said controlled rectifier means to render said controlled rectifier means conductive during at least a fraction of each cycle of said oscillator means the fraction of the cycle during which each controlled rectifier is conductive depending on the magnitude of the signal from said potential comparison means; and
adding means for receiving the signals from said potential source, adding thereto the unipolar signal across said diode means and providing an output equal to the sum of two, the output of said adding means being connected to the output terminals of the voltage regulating apparatus.

4. A D-C voltage regulating apparatus comprising:
a pair of input terminals adapted for connection to a direct current potential source;
a pair of output terminals;
potential comparison means for comparing the potential appearing at said output terminals with a reference potential to produce an output signal whose magnitude is a function of the compared potentials;
transformer means having a primary winding and at least one secondary winding, said secondary winding having two end terminals and an intermediate tap;
a source of alternating potential connected to energize said primary winding of said transformer means;
a rectifier means comprising a first and a second switching means each having a first terminal, a second terminal, and a control terminal for regulating the impedance between said first and said second terminals, the first terminal of said first switching means being connected to one end terminal of said secondary winding and the first terminal of said second switching means being connected to the other end terminal of said secondary winding, and means connecting said second terminals of said first and said second switching means to a common junction which together with said intermediate tap on said secondary winding provides a unipolar output signal from said rectifier means; diode means connected between said intermediate tap and said common junction;
control means adapted to receive a signal from said potential comparison means and a further signal from said source of alternating potential and connected to said control terminals of said switching means to reduce the impedance between said first and said second terminals of said switching means for at least a fraction of each cycle of said source of alternating potential, the fraction of the cycle depending on the magnitude of the signal from said potential comparison means;
adding means for receiving the signals from said potential source, adding thereto the unipolar signal across said diode means, and providing an output which is a function of the sum of the two signals; and
a filter means connected to receive the signal from the output of said adding means, said filter means having its output connected to said output terminals of the voltage regulating apparatus.

References Cited

UNITED STATES PATENTS

| | | | |
|---|---|---|---|
| 2,991,410 | 7/1961 | Seike | 323—100 |
| 3,213,351 | 10/1965 | Walker | 321—18 |
| 3,293,530 | 12/1966 | Baude | 321—18 |

JOHN F. COUCH, *Primary Examiner.*

M. L. WACHTELL, H. HUBERFELD,
*Assistant Examiners.*